United States Patent
Yamamoto

(10) Patent No.: US 10,387,043 B2
(45) Date of Patent: Aug. 20, 2019

(54) WRITING TARGET FILE INCLUDING DETERMINATION OF WHETHER TO APPLY DUPLICATION ELIMINATION

(71) Applicant: NEC Corporation, Minato-ku, Tokyo (JP)

(72) Inventor: Hiroaki Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 14 days.

(21) Appl. No.: 15/422,680

(22) Filed: Feb. 2, 2017

(65) Prior Publication Data

US 2017/0255393 A1    Sep. 7, 2017

(30) Foreign Application Priority Data

Mar. 1, 2016   (JP) .................................. 2016-039135

(51) Int. Cl.
*G06F 3/06* (2006.01)
*G06F 16/174* (2019.01)

(52) U.S. Cl.
CPC .......... *G06F 3/0608* (2013.01); *G06F 3/0641* (2013.01); *G06F 3/0643* (2013.01); *G06F 3/0673* (2013.01); *G06F 16/1748* (2019.01)

(58) Field of Classification Search
CPC combination set(s) only.
See application file for complete search history.

(56) References Cited

U.S. PATENT DOCUMENTS

| | | | |
|---|---|---|---|
| 8,850,130 B1 | 9/2014 | Aron et al. | |
| 9,239,869 B1* | 1/2016 | Zhang | G06F 17/30575 |
| 2009/0276454 A1* | 11/2009 | Smith | G06F 17/30162 |
| 2013/0226881 A1 | 8/2013 | Sharma et al. | |
| 2014/0258655 A1 | 9/2014 | Park et al. | |

FOREIGN PATENT DOCUMENTS

| | | |
|---|---|---|
| JP | 2012-208650 A | 10/2012 |
| JP | 2014-175008 A | 9/2014 |
| JP | 2014-191405 A | 10/2014 |
| JP | 2015-513741 A | 5/2015 |
| WO | 2010/116608 A1 | 10/2010 |
| WO | 2012/117658 A1 | 9/2012 |
| WO | 2015/125271 A1 | 8/2015 |

OTHER PUBLICATIONS

Japanese Office Action for JP Application No. 2016-039135 dated Apr. 3, 2018 with English Translation.

* cited by examiner

*Primary Examiner* — Larry T Mackall

(57) ABSTRACT

A storage device of the present invention includes a control circuit configured to convert a writing target file into one or more blocks and designate a writing method for the writing target file in accordance with whether or not a duplication elimination is to be applied to the writing target file, and a storage circuit including a storage medium and configured to calculate one or more hash values each associated with a corresponding one of the one or more blocks in accordance with the writing method, determine each of one or more addresses on the storage medium on the basis of a corresponding one of the one or more hash values, and write the one or more blocks into the storage medium.

7 Claims, 8 Drawing Sheets

25 FILE MANAGEMENT TABLE

| FILE PATH | FILE IDENTIFICATION NUMBER | OFFSET | BLOCK SIZE | CONTENT ADDRESS |
|---|---|---|---|---|
| fsA:/dirZ/fileY | 1357 | 0 | 4096 | 72ff40 |
| fsA:/dirZ/fileY | 1357 | 4096 | 8192 | 9a1c70 |
| fsB:/fileX | 1358 | 0 | 11463 | 141787 |
| fsB:/fileX | 1358 | 11463 | 21341 | c3fb07 |
| fsB:/fileX | 1358 | 32804 | 12738 | e46240 |
| fsC:/dirW/fileV | 1359 | 0 | 4096 | 0cdc1e |
| fsC:/dirW/fileU | 1360 | 0 | 27103 | 422902 |

24 MODE MANAGEMENT TABLE

| TARGET PATH | MODE |
| --- | --- |
| fsA:/ | DE |
| fsB:/ | DE |
| fsB:/dirZ | GP |
| fsC | GP |
| fsC:/dirY/fileX | DE |
| fsD:/ | GP |
| fsD:/dirW | DE |

Fig.4

25 FILE MANAGEMENT TABLE

| FILE PATH | FILE IDENTIFICATION NUMBER | OFFSET | BLOCK SIZE | CONTENT ADDRESS |
|---|---|---|---|---|
| fsA:/dirZ/fileY | 1357 | 0 | 4096 | 72ff40 |
| fsA:/dirZ/fileY | 1357 | 4096 | 8192 | 9a1c70 |
| fsB:/fileX | 1358 | 0 | 11463 | 141787 |
| fsB:/fileX | 1358 | 11463 | 21341 | c3fb07 |
| fsB:/fileX | 1358 | 32804 | 12738 | e46240 |
| fsC:/dirW/fileV | 1359 | 0 | 4096 | 0cdc1e |
| fsC:/dirW/fileU | 1360 | 0 | 27103 | 422902 |

26 UNUSED FILE TABLE

| FILE IDENTIFICATION NUMBER | FILE SIZE |
|---|---|
| 1234 | 122880 |
| 5678 | 77824 |
| 9013 | 32768 |

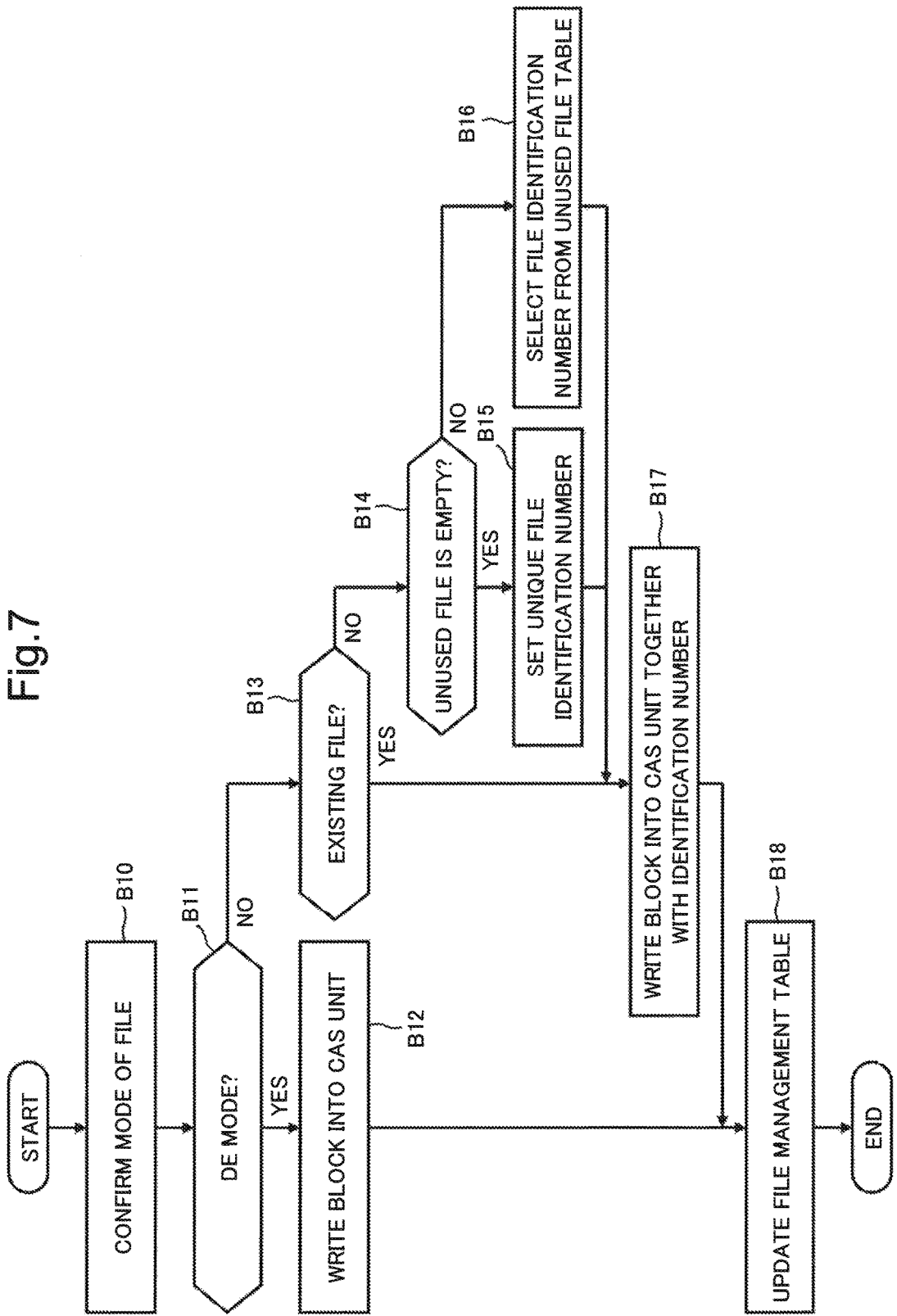

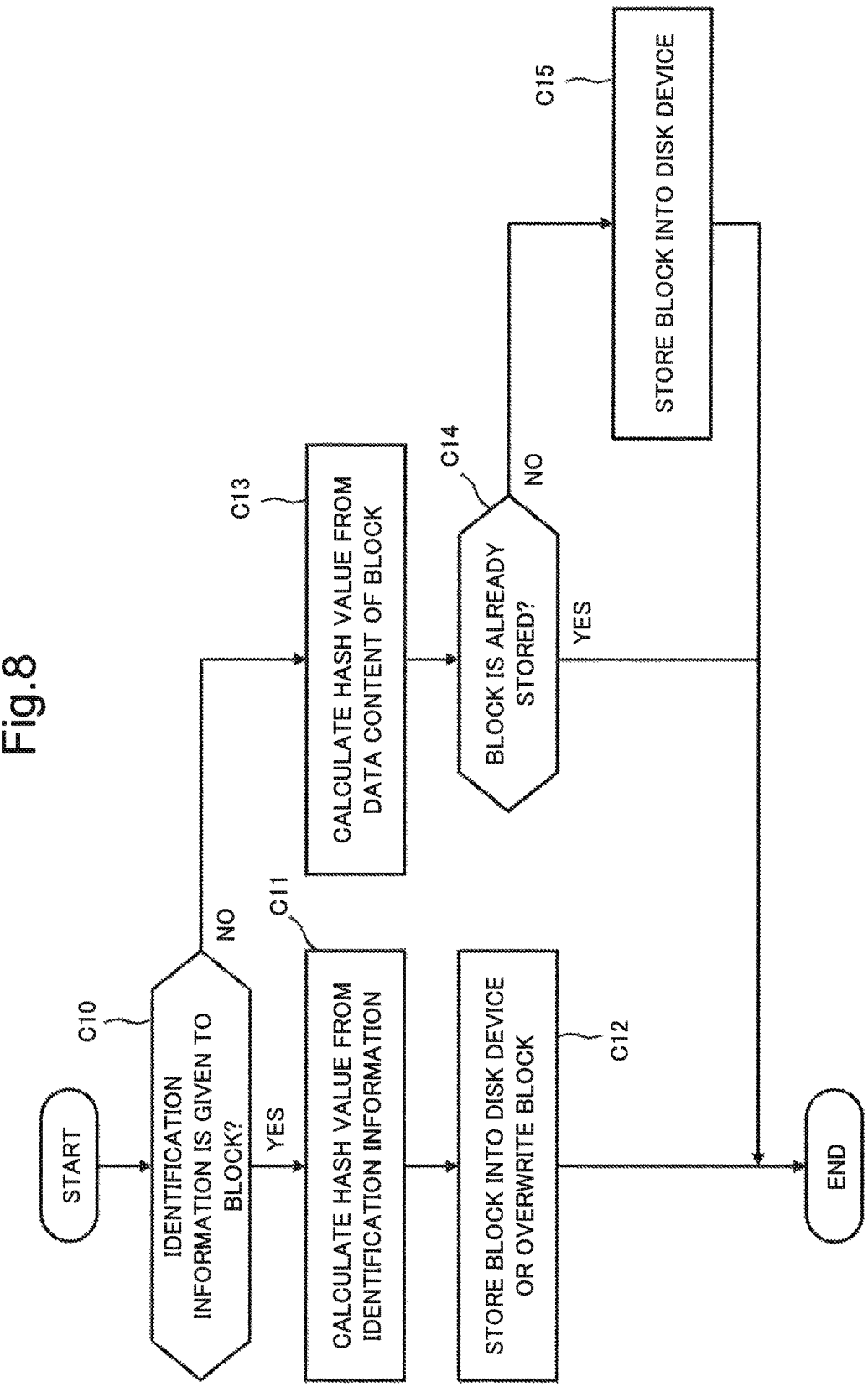

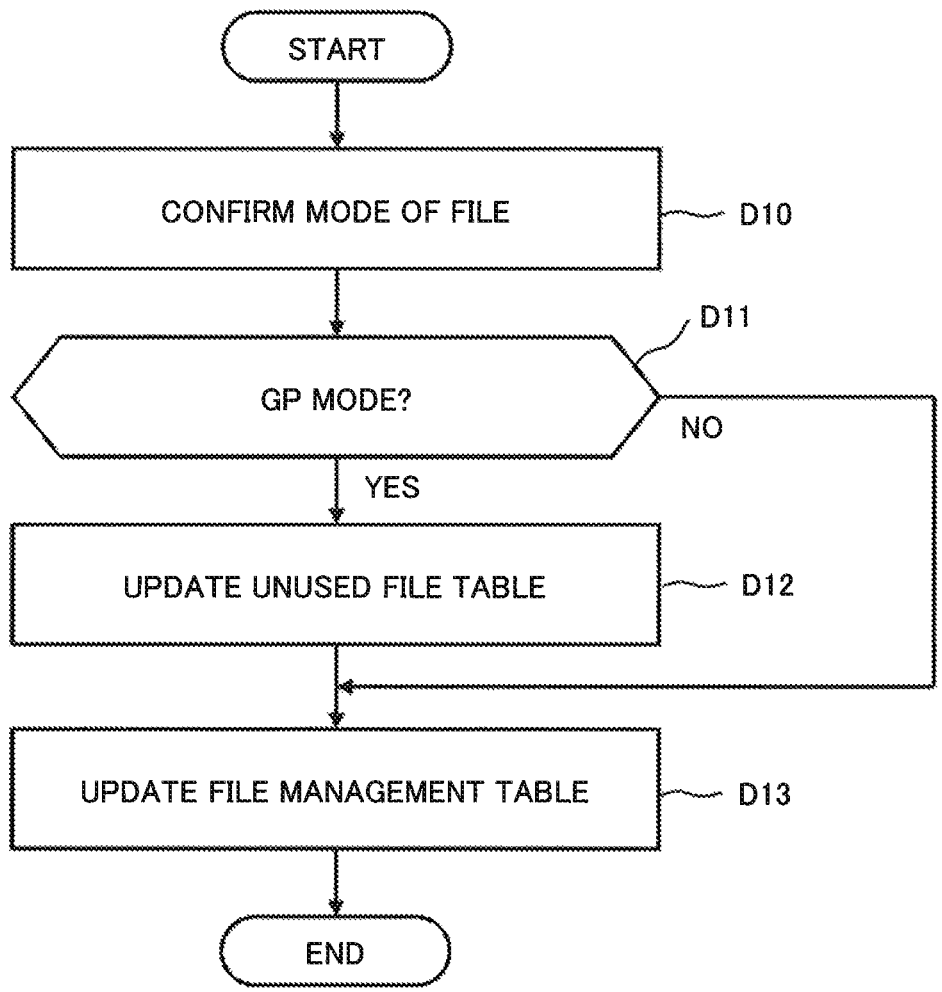

WRITING TARGET FILE INCLUDING DETERMINATION OF WHETHER TO APPLY DUPLICATION ELIMINATION

This application is based upon and claims the benefit of priority from Japanese Patent Application No. 2016-039135, filed on Mar. 1, 2016, the disclosure of which is incorporated herein in its entirety by reference.

TECHNICAL FIELD

The present invention relates to a storage technology involving a duplication elimination function.

BACKGROUND ART

A CAS (Content Addressed Storage) system involving a duplication elimination function that allows duplicated file data included in a plurality of files to be stored so as to be shared has been developed. In the CAS system, file data is distributed and stored into a plurality of storage media, and each of locations at which the file data is stored is specified by a corresponding one of unique content addresses specified by the content of the file data. The CAS system enables rewriting of duplicated file data to be omitted, and thus, not only the process performance of writing, but also the utilization efficiency of the storage media, is improved.

In WO 2015/125271, there is disclosed a storage system in which a plurality of node devices are combined via a network and file data is written into a disk array device. According to WO 2015/125271, a certain node device performs processing for writing the file data, and another node device different from the certain node device performs duplication elimination processing. This configuration reduces the influence of the duplication elimination processing on the process performance of reading/writing by each of the node devices.

In WO 2012/117658, there is disclosed a storage system including a plurality of storage processing devices configured to distribute and store data into a plurality of storage devices and perform duplication elimination processing, and a switch unit configured to assign a dataflow including a group of data to any one of the storage processing devices, and make a setting so as to allow the dataflow to flow to the assigned storage processing device. According to WO 2012/117658, the switch unit assigns the dataflow on the basis of the characteristic of the dataflow and the characteristic of each of the storage processing devices. This configuration realizes an efficient load distribution in the storage system.

In WO 2010/116608, there is disclosed a related technology that allows file data to be distributed and stored. In a distributed data storage delivery system, computers each including a storage device for storing data therein are coupled to a plurality of networks so as to build a data storage system of a large capacity. Further, the distributed data storage delivery system includes the function of allocating data and the function of managing the allocation of the data. Here, in WO 2010/116608, duplication elimination processing is not mentioned at all.

SUMMARY

However, in the storage systems (CAS systems) disclosed in WO 2015/125271 and WO 2012/117658 and including the duplication elimination function, there are problems described below.

In the storage systems disclosed in WO 2015/125271 and WO 2012/117658, there are problems in that, when partial overwriting and deletion of a file are repeatedly performed, regions each storing unaccessed data are not readily available, and a situation in which the arrangement of file data does not coincide with the arrangement of data in the storage medium easily occurs. As a result, the utilization efficiency of the storage medium and the process performance, such as the speed of writing/reading of file data, are deteriorated. Even though, in order to cope with these problems, normal writing/reading which is suitable for the overwriting and the deletion and in which the duplication elimination is not performed is executed, the utilization efficiency of the storage medium is reduced.

Further, in the storage systems disclosed in WO 2015/125271 and WO 2012/117658, the duplication elimination function is realized by allowing a plurality of devices to be coupled to and cooperate with one another. However, WO 2015/125271 and WO 2012/117658 do not disclose any technology capable of realizing the duplication elimination function on a single-device basis without reducing the process performance. The cost of the system becomes high because the plurality of devices are needed.

Further, in WO 2015/125271, there is also disclosed a technology that allows one physical CPU (Central Processing Unit) to be divided into two logical CPUs, one being a logical CPU that executes file data writing processing, the other one being a logical CPU that executes duplication elimination processing. In this case, however, in order that each of the two logical CPUs is not influenced by processing load on the other one of the logical CPUs, an upper limit is provided on a processing amount of each of the logical CPUs for reducing their original processing power.

The present invention has been made in view of the above problems, and it is an object of the present invention to provide a storage device configured to properly use, on a single-device basis, either writing involving a duplication elimination or writing not involving the duplication elimination in accordance with the result of the determination, for each file, as to which of the utilization efficiency and the process performance of writing/reading with respect to a storage medium is to be prioritized.

A storage device of the present invention includes a control unit configured to convert a writing target file into one or more blocks and designate a writing method for the writing target file in accordance with whether or not a duplication elimination is to be applied to the writing target file, and a storage unit including a storage medium and configured to calculate one or more hash values each associated with a corresponding one of the one or more blocks in accordance with the writing method, determine each of one or more addresses on the storage medium on the basis of a corresponding one of the one or more hash values, and write the one or more blocks into the storage medium.

A storage method of the present invention includes converting a writing target file into one or more blocks, designating a writing method for the writing target file in accordance with whether or not a duplication elimination is to be applied to the writing target file, calculating one or more hash values each associated with a corresponding one of the one or more blocks in accordance with the writing method, determining each of one or more addresses on a storage medium on the basis of a corresponding one of the one or more hash values, and writing the one or more blocks into the storage medium.

According to the present invention, a storage device configured to properly use, on a single-device basis, either writing involving a duplication elimination or writing not involving the duplication elimination in accordance with the result of the determination, for each file, as to which of the utilization efficiency and the process performance of writing/reading with respect to a storage medium is to be prioritized is provided.

BRIEF DESCRIPTION OF THE DRAWINGS

Exemplary features and advantages of the present invention will become apparent from the following detailed description when taken with the accompanying drawings in which:

FIG. 4 is a diagram illustrating an example on a file management table of the storage device according to the second example embodiment of the present invention;

FIG. 7 is a flowchart illustrating file writing operation of the storage device according to the second example embodiment of the present invention;

FIG. 8 is a flowchart illustrating file writing operation of the storage device according to the second example embodiment of the present invention; and FIG. 9 is a flowchart illustrating the file deletion operation of the storage device according to the second example embodiment of the present invention.

EXAMPLE EMBODIMENT

Hereinafter, embodiments of the present invention will be described in detail with reference to the drawings. In this regard, however, although technically preferred limitations are made on embodiments described below in order to practice the present invention, the scope of the invention is not limited to the embodiments described below.

First Example Embodiment

Figure 1:
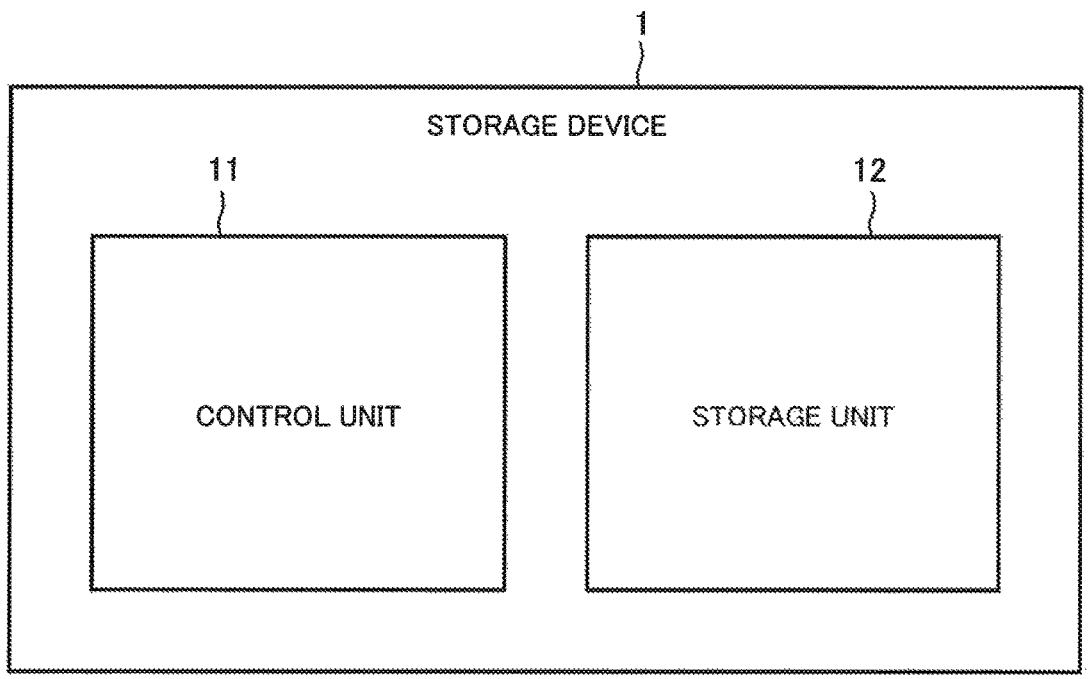
FIG. 1 is a block diagram illustrating a configuration of a storage device according to a first example embodiment of the present invention.

FIG. 1 is a block diagram illustrating a configuration of a storage device according to a first example embodiment of the present invention. A storage device 1 according to this embodiment includes a control unit 11. The control unit 11 converts a writing target file into one or more blocks and designates a writing method for writing the writing target file in accordance with whether or not a duplication elimination is to be applied to the writing target file. Moreover, the storage device 1 includes a storage unit 12. The storage unit 12 includes a storage medium and calculates hash values each associated with a corresponding one of the one or more blocks in accordance with the writing method. The storage unit 12 determines one or more addresses on the storage medium on the basis of the respective hash values, and then writes the one or more blocks into the storage medium.

The storage device 1 is capable of, on a single-device basis, dealing with both of writing in which a duplication elimination is performed and normal writing in which any duplication elimination is not performed.

As described above, this embodiment can provide a storage device configured to properly use, on a single-device basis, either writing involving a duplication elimination or writing not involving the duplication elimination in accordance with the result of the determination, for each file, as to which of the utilization efficiency and the process performance of writing/reading with respect to a storage medium is to be prioritized.

Second Example Embodiment

Figure 2:
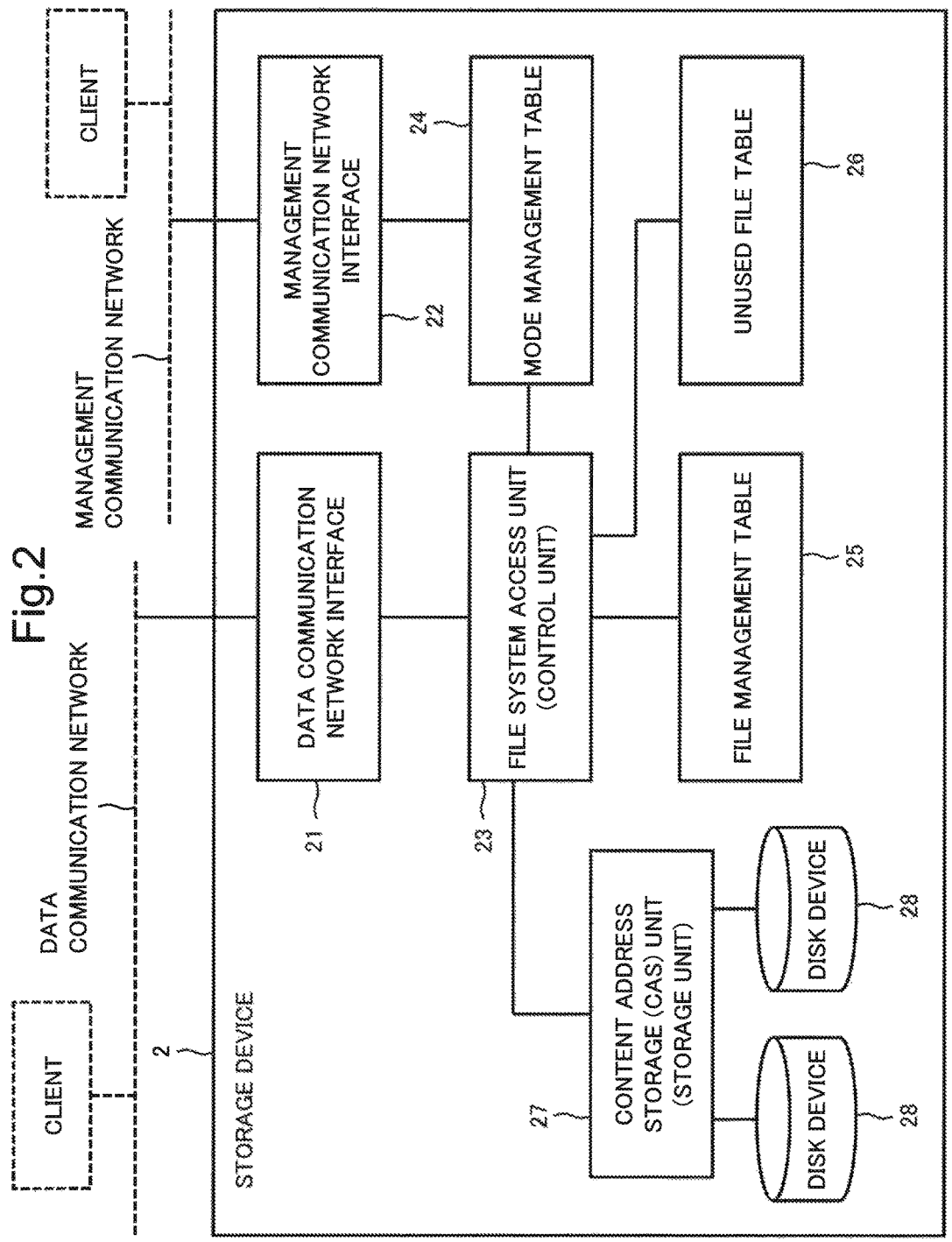
FIG. 2 is a block diagram illustrating a configuration of a storage device according to a second example embodiment of the present invention.

FIG. 2 is a block diagram illustrating a configuration of a storage device according to a second example embodiment of the present invention. A storage device 2 according to this second example embodiment includes a data communication data communication network interface 21, a management communication network interface 22, and a file system access unit 23. This file system access unit 23 serves as the control unit. Further, the storage device 2 includes a mode management table 24, a file management table 25, and an unused file table 26. Further, the storage device 2 includes a content address storage unit 27 (CAS unit 27) and a disk device 28. The CAS unit and the disk device 28 serve as the storage unit.

The storage device 2 is coupled to a client, a user terminal, through a data communication network and a management communication network. The client performs operation on files of the storage device 2, such as reading/writing from/ into the files, through the data communication network. Further, the client performs settings and management of the storage device 2 through the management communication network. An information terminal, such as a PC (Personal Computer) or a server, may serve as the client.

Further, a client coupled to the data communication network and a client coupled to the management communication network may be the same client, or may be mutually independent clients. Further, the client may be a single client or a plurality of clients. Further, the data communication network and the management communication network may be mutually independent networks, or may be the same network.

The data communication network interface 21 is coupled to the client via the data communication network. The management communication network interface 22 is coupled to the client via the management communication network. The data communication and the management communication can be performed by TCP/IP (Transmission Control Protocol/Internet Protocol) or any other appropriate protocol.

The mode management table 24 designates whether writing of a file is to be performed in a duplication elimination (DE) mode in which a duplication elimination is performed, or in a general purpose (GP) mode in which the duplication elimination is not performed. The mode management table 24 is set by the client through the management communication network.

The file system access unit 23 is accessed from the client through the data communication network. In the access from the client, a protocol, such as CIFS (Common Internet File System), NFS (Network File System) or FTP (File Transfer Protocol) can be used.

The file system access unit 23 converts an in/out (I/O) request from the client into an I/O request to the CAS unit 27, which is positioned in a lower layer, and executes a process for the I/O request. Upon receipt of the request from the client, the file system access unit 23 performs various processes, such as dividing into blocks, writing, reading, and deleting, with respect to files written in the CAS unit 27. The file system access unit 23 is capable of dividing into the blocks on the basis of criteria that are set in the file system access unit 23. In the division into the blocks, the sizes of the blocks can be fixed or variable. For example, a file having a size of 1024 KB can be divided into, for example, eight blocks each having a size of 96 KB and four blocks each having a size of 64 KB.

The file system access unit 23 creates the file management table 25 and the unused file table 26 to manage files. Further, the file system access unit 23 designates a file to be written into the CAS unit 27 to any one of the DE mode and the GP mode on the basis of the mode management table 24.

The CAS unit 27 is coupled to the disk device 28, and manages the disk device 28. That is, the CAS unit 27 writes each of blocks constituting files into the disk device 28 in the DE mode or the GP mode, whichever is designated by the file system access unit 23, and reads it. The disk device 28 can be realized by a storage device, such as a HDD (Hard Disk Drive) or an SSD (Solid State Drive). Here, although two disk devices 28 are illustrated in FIG. 2, the number of the disk devices 28 may be optionally determined.

The file system access unit 23 and the CAS unit 27 can be realized by using a CPU allowed to execute programs.

Figure 3:
FIG. 3 is a diagram illustrating an example of a mode management table of the storage device according to the second example embodiment of the present invention.

FIG. 3 is a diagram illustrating an example of the mode management table 24. The mode management table 24 is set by the client through the management communication network. In column "TARGET PATH", paths of a file system, a directory, a file, and the like are stored. Each of the paths is a target of the setting of the DE mode or the GP mode. In column "MODE", in the case where the duplication elimination is prioritized, a code (DE) representing the DE mode is stored, and in the case where general I/O characteristics are prioritized, a code (GP) representing the GP mode is stored.

FIG. 4 is a diagram illustrating an example of the file management table 25. In column "FILE PATH", all paths of each of files that become targets of management are stored. In column "FILE IDENTIFICATION NUMBER", identification numbers each allocated to a corresponding file and being a unique number not duplicated with those of any other files are stored. Further, the file management table 25 stores therein information in relation to each of one or more blocks constituting a file. In column "OFFSET", a starting position of a block is stored, and in column "BLOCK SIZE", the size of the block is stored. While FIG. 4 indicates a case where the block size is variable, the block size may be fixed. Moreover, in column "CONTENT ADDRESS", content addresses each having been obtained from the disk device 28 when the CAS unit 27 has stored a corresponding block into the disk device 28 are stored.

The file path is set to a corresponding file by the client. When the client selects the DE mode for a relevant file, that is, the client prioritizes the utilization efficiency of a storage medium, the client is able to set a file path of the relevant file in accordance with the mode management table 24, to which file paths associated with the DE mode have been set in advance, so as to allow the file path of the relevant file to be associated with "DE". Further, when the client selects the GP mode for a relevant file, that is, the client prioritizes the process performance of writing/reading, the client is able to set a file path of the relevant file in accordance with the mode management table 24 so as to allow the file path of the relevant file to be associated with "GP".

The file identification numbers, the offsets, and the block sizes are set by the file system access unit 23. Further, the file system access unit 23 receives the content address of each block from the CAS unit 27. The file system access unit 23 registers, for each block, the file path, the file identification number, the offset, the block size, and the content address into the file management table 25.

Figures 5, 6:
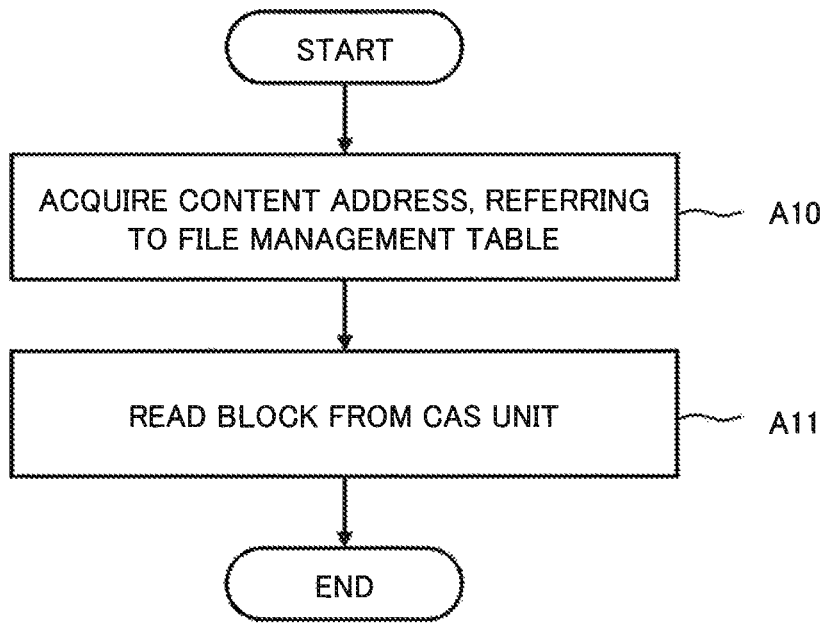
FIG. 5 is a diagram illustrating an example of an unused file table of the storage device according to the second example embodiment of the present invention.
FIG. 6 is a flowchart illustrating file reading operation of the storage device according to the second example embodiment of the present invention.

FIG. 5 is a diagram illustrating an example of the unused file table 26. In the unused file table 26, the file identification numbers of deleted files and the file sizes of the deleted files at the time of deletion are stored. The file system access unit 23 registers the file identification numbers and the file sizes of the deleted files into the unused file table 26.

Next, the operation of the storage device 2 will be described for each of three divided operations, that is, a file reading operation, a file writing operation, and a file deletion operation.

FIG. 6 is a flowchart illustrating the file reading operation of the storage device 2. The execution of processes of the flowchart shown in FIG. 6 for each of blocks constituting a file realizes reading of the file. In the flowchart shown in FIG. 6, the storage device 2 starts its processes when the file system access unit 23 has received, from a client, a designation of a file path of a file to be read.

The file system access unit 23 refers to the file management table 25 to obtain content addresses of blocks that constitute the file corresponding to the file path and being the target of the reading (step A10).

The file system access unit 23 instructs the CAS unit 27 to read the blocks on the basis of the content addresses of the blocks, which constitute the file being the target of the reading. The CAS unit 27 reads the blocks corresponding to the content addresses from the disk device 28, transmits the blocks to the file system access unit 23 (step A11), and then terminates the process flow. Thereafter, the file system access unit 23 can restore the blocks into a file, and transmit the file to the client through the data communication network interface 21.

FIG. 7 is a flowchart illustrating the operation of the file system access unit 23 in the file writing operation of the storage device 2. In the flowchart shown in FIG. 7, the storage device 2 starts its processes when the file system access unit 23 has received, from a client, a designation of a file to be written. A file path is set to the file.

The file system access unit 23 refers to the file path of the file and target paths and modes included in the mode management table 24 to confirm whether the writing target file corresponds to the DE mode or the GP mode (step B10). In the case of the DE mode (YES in step B11), the file system access unit 23 writes blocks of the writing target file into the CAS unit 27 (step B12), and then the process flow proceeds to step B18. The writing operation of the CAS unit 27 will be described later.

In the process of step B12, when the relevant file is a new file, the file system access unit 23 sets a unique file identification number to the relevant file. Moreover, the file system access unit 23 divides the file into blocks on the basis of criteria having been set in the file system access unit 23. The file system access unit 23 registers, for each of the divided blocks, a set of block identification information including three groups of a file identification number, a start offset of the relevant block, and a block size into the file management table, together with the file path. Further, the file system access unit 23 writes each of the blocks into the CAS unit 27 without giving the set of block identification information.

In the case of the GP mode (NO in step B11), the file system access unit 23 confirms whether the file is an existing file or a new file. That is, when a file identification number is set to the relevant file, the relevant file is determined to be an existing file, and when any file identification number is not set to the relevant file, the relevant file is determined to be a new file (step B13).

In the case of the existing file (YES in step B13), the process flow proceeds to step B17. In the case of the new file (NO in step B13), a file identification number is set in a way described below.

First, the file system access unit 23 confirms whether or not the unused file table 26 is empty (step B14). In the case where the unused file table 26 is empty (YES in step B13), the file system access unit 23 newly sets a unique file identification number (step B15).

In the case where the unused file table 26 is not empty (NO in step B13), the file system access unit 23 selects one unused file identification number from the unused file table 26 and sets it (step B16). For example, the selection of the unused file identification number may be sequentially selected in descending order in the unused file table 26. Subsequently, the file system access unit 23 deletes the selected file identification number from the unused file table 26.

With this process, when a new file to which one unused file identification number has been set has the same block size and offset as those of a previous file, as a result, the new file is stored at the same content address as that of the previous file. That is, a content address having become unused in the disk device 28 is not left unused, but can be used in the storage of new file data, and thus, this configuration enables writing in which the utilization efficiency of a storage medium is improved.

Here, the process in step B12 is not executed in such a way as described in the processes of steps B14 to B16. This is because, in the case of the DE mode, a block having the same content is given the same content address to allow a block duplicated among a plurality of files to be stored only once so as to save the capacity of the storage medium.

The file system access unit 23 gives a set of block identification information including three groups of a file identification number, an offset, and a block size to each of the blocks, and registers the blocks into the CAS unit 27 (step B17). Thereafter, the flow proceeds to step B18. The writing operation of the CAS unit 27 will be described later.

In the process of step B17, the file system access unit 23 divides the relevant file into blocks on the basis of criteria having been set in the file system access unit 23. At this time, there is also a case where the relevant file is not divided into blocks, but the entire file is handled as one block. In the file management table 25 shown in FIG. 4 exemplifies the case where each of files of file identification numbers "1359" and "1360" of GP-mode is entirely handled as one block.

The file system access unit 23 registers, for each of the blocks, a set of block identification information including three groups of a file identification number, an offset, and a block size into the file management table together with the file path. Further, the file system access unit 23 gives the set of block identification information to each of the blocks, and writes the blocks into the CAS unit 27.

In step B18, the file system access unit 23 receives content addresses of the respective blocks from the CAS unit 27, and updates the file management table 25 with the received content addresses. Thereafter, the file system access unit 23 terminates the process flow.

FIG. 8 is a flowchart illustrating the operation of the CAS unit 27 in the file writing operation of the storage device 2. In the flowchart shown in FIG. 8, the storage device 2 starts its processes when the CAS unit 27 has received writing of blocks, from the file system access unit 23.

The CAS unit 27 confirms whether or not the set of identification information (the file identification number, the offset, and the block size) is given to each of the blocks to be written (step C10).

In the case where the set of identification information is given (YES in step C10), the CAS unit 27 calculates, for each of the blocks, a hash value corresponding to the set of block identification information (step C11).

The CAS unit 27 determines, for each of the blocks, a storage destination on the disk device 28 on the basis of the calculated hash value, executes writing, and then notifies the file system access unit 23 of a content address of the storage destination for the each of the blocks (step C12). Thereafter, the CAS unit 27 terminates the process flow. In this case, when the blocks are already written, writing is executed so as to overwrite the blocks.

In the case where the determination result is YES in step C10, the blocks are stored in the GP mode. The set of identification information from which the hash value is calculated is not the content of the block itself, and thus, when the blocks are already written, the latest content is capable of being stored by overwriting the blocks. Further, the calculation of the hash value from the set of identification information is easier than the calculation of the hash value from the content of the block, and thus enables writing of a corresponding block to be performed faster.

Here, a method for determining an address of a storage destination of a block on the basis of a hash value can be performed in a way described below. That is, the CAS unit 27 retains a correspondence table containing hash values and addresses at which corresponding blocks have been written. When the hash value of a given block already exists in the correspondence table, a corresponding address can be used. When the hash value of a given block does not exist in the correspondence table, after the storage of the block into the disk device 28, the correspondence table is updated with an address at which the block has been stored.

In the case where the set of identification information is not given (NO in step C10), the CAS unit 27 calculates a hash value corresponding to the content of each of the blocks (step C13). The CAS unit 27 determines whether or not the blocks are already stored (step C14). In the case where the blocks are already stored (YES in step C14), overwriting is not performed, and then the process flow is terminated.

In the case where the blocks are not stored (NO in step C14), the CAS unit 27 determines, for each of blocks, a storage destination on the disk device 28 on the basis of the calculated hash value, execute writing, and notifies the file system access unit 23 of a content address of the storage destination of the each of the blocks (step C15). Thereafter, the CAS unit 27 terminates the process flow. In the case where the determination result is NO in step C10, the blocks are stored in the DE mode. This configuration, therefore, enables realization of the improvement of the utilization efficiency of a storage medium, the speed-up of writing because of no execution of overwriting, and the like.

FIG. 9 is a flowchart illustrating the file deletion operation of the storage device 2. In the flowchart shown in FIG. 9, the storage device 2 starts its processes when the file system access unit 23 has received, from the client, a designation of a file path of a file to be deleted.

The file system access unit 23 refers to the file path and the mode management table 24 to confirm a mode of the deletion target file (step D10). In the case of the GP mode (YES in step D11), the file system access unit 23 acquires an identification number and a block size of the deletion target file from the file management table 25, and updates the unused file table 26 with the acquired identification number and block size (step D12). Next, the file system access unit 23 deletes the relevant file, and updates the file management table 25 by deleting information in relation to the relevant file from the file management table 25 (step D13). Thereafter, the file system access unit 23 terminates the process flow.

In the case of the DE mode (NO in step D11), the file system access unit 23 deletes the relevant file, and updates the file management table 25 by deleting information in relation to the relevant file from the file management table 25 (step D13). Thereafter, the file system access unit 23 terminates the process flow.

Here, the mode management table 24, the file management table 25, and the unused file table 26 can be stored in the file system access unit 23 by accommodating storage medium such as a memory in the file system access unit 23, but this embodiment is not limited to this configuration. The mode management table 24, the file management table 25, and the unused file table 26 may be stored in the CAS unit.

Here, the mode management table 24, the file management table 25, and the unused file table 26 respectively have a table form shown in FIG. 3, a table form shown in FIG. 4, and a table form shown in FIG. 5, but the present invention is not limited to these table forms. The mode management table 24, the file management table 25, and the unused file table 26 may be created in the form of a data structure, such as B-tree. Further, the mode management table 24, the file management table 25, and the unused file table 26 each may be created in any form, provided that the data structure of the mode management table 24, the data structure of the file management table 25, and the data structure of the unused file table 26 are respectively capable of retaining and managing information equivalent to the table shown in FIG. 3, information equivalent to the table shown in FIG. 4, and information equivalent to the table shown in FIG. 5.

As described above, the storage device 2 according to this embodiment calculates hash values each associated with a corresponding one of blocks in accordance with a storage method relating to the blocks and designated by a client, determines each of addresses of the blocks in a storage medium on the basis of a corresponding one of the calculated hash values, and then writes the blocks into the storage medium. This configuration enables separation into an address at which the duplication elimination is to be performed and an address at which the duplication elimination is not to be performed on the basis of hash values. The storage device 2, therefore, is capable of, on a single-device basis, dealing with both of writing in which the duplication elimination is performed and normal writing in which the duplication elimination is not performed.

Moreover, when the duplication elimination is not performed, the storage device 2 allocates a content address existing on the storage medium and having become unused by the deletion of a file, to a new file. This configuration realizes a writing method that minimizes the reduction of and improves the usage efficiency of a storage medium, which is the problem that occurs when storage destinations of a file in the storage medium are selected on the basis of the content of the file.

As described above, according to this embodiment, a storage device configured to properly use, on a single-device basis, either writing involving a duplication elimination or writing not involving the duplication elimination in accordance with the result of the determination, for each file, as to which of the utilization efficiency and the process performance of writing/reading with respect to a storage medium is to be prioritized is capable of being provided.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims. Further, it is noted that the inventor's intent is to retain all equivalents of the claimed invention even if the claims are amended during prosecution.

The whole or part of the example embodiments disclosed above can be described as, but not limited to, the following supplementary notes.

Supplementary Note 1

A storage device including a control unit configured to convert a writing target file into one or more blocks and designate a writing method for the writing target file in accordance with whether or not a duplication elimination is to be applied to the writing target file, and a storage unit including a storage medium and configured to calculate one or more hash values each associated with a corresponding one of the one or more blocks in accordance with the writing method, determine each of one or more addresses on the storage medium on the basis of a corresponding one of the one or more hash values, and write the one or more blocks into the storage medium.

Supplementary Note 2

The storage device according to Supplementary Note 1, wherein in a case where the writing method is a method in which the duplication elimination is applied to the writing target file, the storage unit calculates the one or more hash values from content of a corresponding one of the one or more blocks.

Supplementary Note 3

The storage device according to Supplementary Note 1 or Supplementary Note 2, wherein in a case where the writing method is a method in which the duplication elimination is not applied to the writing target file, the control unit gives each of one or more sets of identification information to a corresponding one of the one or more blocks, and the storage unit calculates each of the one or more hash values from a corresponding one of the one or more sets of identification information.

Supplementary Note 4

The storage device according to Supplementary Note 3, wherein each of the one or more sets of identification information includes an identification number, an offset, and a block size of a corresponding one of the one or more blocks.

Supplementary Note 5

The storage device according to any one of Supplementary Notes 1 to 4, wherein the control unit designates whether or not the duplication elimination is to be applied, on the basis of a designation by a client.

Supplementary Note 6

The storage device according to any one of Supplementary Notes 1 to 5, wherein in a case where the writing method is a method in which the duplication elimination is applied to the writing target file, the storage unit does not overwrite the one or more blocks when the one or more blocks are written in advance.

Supplementary Note 7

The storage device according to any one of Supplementary Notes 1 to 6, wherein in a case where the writing method is a method in which the duplication elimination is not applied to the writing target file, the storage unit overwrites the one or more blocks when the one or more blocks are written in advance.

Supplementary Note 8

The storage device according to any one of Supplementary Notes 4 to 7, wherein in a case where the writing method is a method in which the duplication elimination is not applied to the writing target file, the storage unit selects and sets the identification number from among at least one identification number having been previously set and being in an unused state.

Supplementary Note 9

A storage method including converting a writing target file into one or more blocks, designating a writing method for the writing target file in accordance with whether or not a duplication elimination is to be applied to the writing target file, calculating one or more hash values each associated with a corresponding one of the one or more blocks in accordance with the writing method, determining each of one or more addresses on a storage medium on the basis of a corresponding one of the one or more hash values, and writing the one or more blocks into the storage medium.

Supplementary Note 10

The storage method according to Supplementary Note 9, wherein in a case where the writing method is a method in which the duplication elimination is applied to the writing target file, the one or more hash values are calculated from content of a corresponding one of the one or more blocks.

Supplementary Note 11

The storage method according to Supplementary Note 9 or Supplementary Note 10, wherein in a case where the writing method is a method in which the duplication elimination is not applied to the writing target file, one or more sets of identification information are given to a corresponding one of the one or more blocks, and each of the one or more hash values is calculated from a corresponding one of the one or more sets of identification information.

Supplementary Note 12

The storage method according to Supplementary Note 11, wherein each of the one or more sets of identification information includes an identification number, an offset, and a block size of a corresponding one of the one or more blocks.

Supplementary Note 13

The storage method according to any one of Supplementary Notes 9 to 12, wherein it is designated whether or not the duplication elimination is to be applied, on the basis of a designation by a client.

Supplementary Note 14

The storage method according to any one of Supplementary Notes 9 to 13, wherein in a case where the writing method is a method in which the duplication elimination is applied to the writing target file, the one or more blocks are not overwritten when the one or more blocks are written in advance.

Supplementary Note 15

The storage method according to any one of Supplementary Notes 9 to 14, wherein in a case where the writing method is a method in which the duplication elimination is not applied to the writing target file, the one or more blocks are overwritten when the one or more blocks are written in advance.

Supplementary Note 16

The storage method according to any one of Supplementary Notes 12 to 15, wherein in a case where the writing method is a method in which the duplication elimination is applied to the writing target file, the identification number is selected and set from among at least one identification number having been previously set and being in an unused state.

The invention claimed is:
1. A storage device including
    a control circuit configured to convert a writing target file into one or more blocks and designate a writing method for the writing target file in accordance with whether or not a duplication elimination is to be applied to the writing target file, and
    a storage circuit including a storage medium and configured to calculate one or more hash values each associated with a corresponding one of the one or more blocks in accordance with the writing method, determine each of one or more addresses on the storage medium on the basis of a corresponding one of the one or more hash values, and write the one or more blocks into the storage medium
    in the case where the duplication elimination is not to be applied,
    the control circuit gives each of one or more sets of identification information to a corresponding one of the one or more blocks, and the storage circuit calculates each of the one or more hash values from a corresponding one of the one or more sets of identification information, wherein each of the one or more sets of identification information consists of an identification number, an offset, and a block size of a corresponding one of the one or more blocks.

2. The storage device according to claim 1, wherein in a case where the writing method is a method in which the duplication elimination is applied to the writing target file, the storage circuit calculates the one or more hash values from content of a corresponding one of the one or more blocks.

3. The storage device according to claim 1, wherein the control circuit designates whether or not the duplication elimination is to be applied, on the basis of a designation by a client.

4. The storage device according to claim 1, wherein in a case where the writing method is a method in which the duplication elimination is applied to the writing target file, the storage circuit does not overwrite the one or more blocks when the one or more blocks are written in advance.

5. The storage device according to claim 1, wherein in a case where the writing method is a method in which the duplication elimination is not applied to the writing target file, the storage circuit overwrites the one or more blocks when the one or more blocks are written in advance.

6. The storage device according to claim 1, wherein in a case where the writing method is a method in which the duplication elimination is not applied to the writing target file, the storage circuit selects and sets the identification number from among at least one identification number having been previously set and being in an unused state.

7. A storage method including converting a writing target file into one or more blocks, designating a writing method for the writing target file in accordance with whether or not a duplication elimination is to be applied to the writing target file, calculating one or more hash values each associated with a corresponding one of the one or more blocks in accordance with the writing method, determining each of one or more addresses on a storage medium on the basis of a corresponding one of the one or more hash values, writing the one or more blocks into the storage medium, determining that the duplication elimination is not to be applied, and in response, giving each of one or more sets of identification information to a corresponding one of the one or more blocks, and calculating each of the one or more hash values from a corresponding one of the one or more sets of identification information, wherein each of the one or more sets of identification information consists of an identification number, an offset, and a block size of a corresponding one of the one or more blocks.

* * * * *